W. FLEENOR.
POWER TRANSMITTING MECHANISM.
APPLICATION FILED SEPT. 12, 1914.
1,202,500.
Patented Oct. 24, 1916.
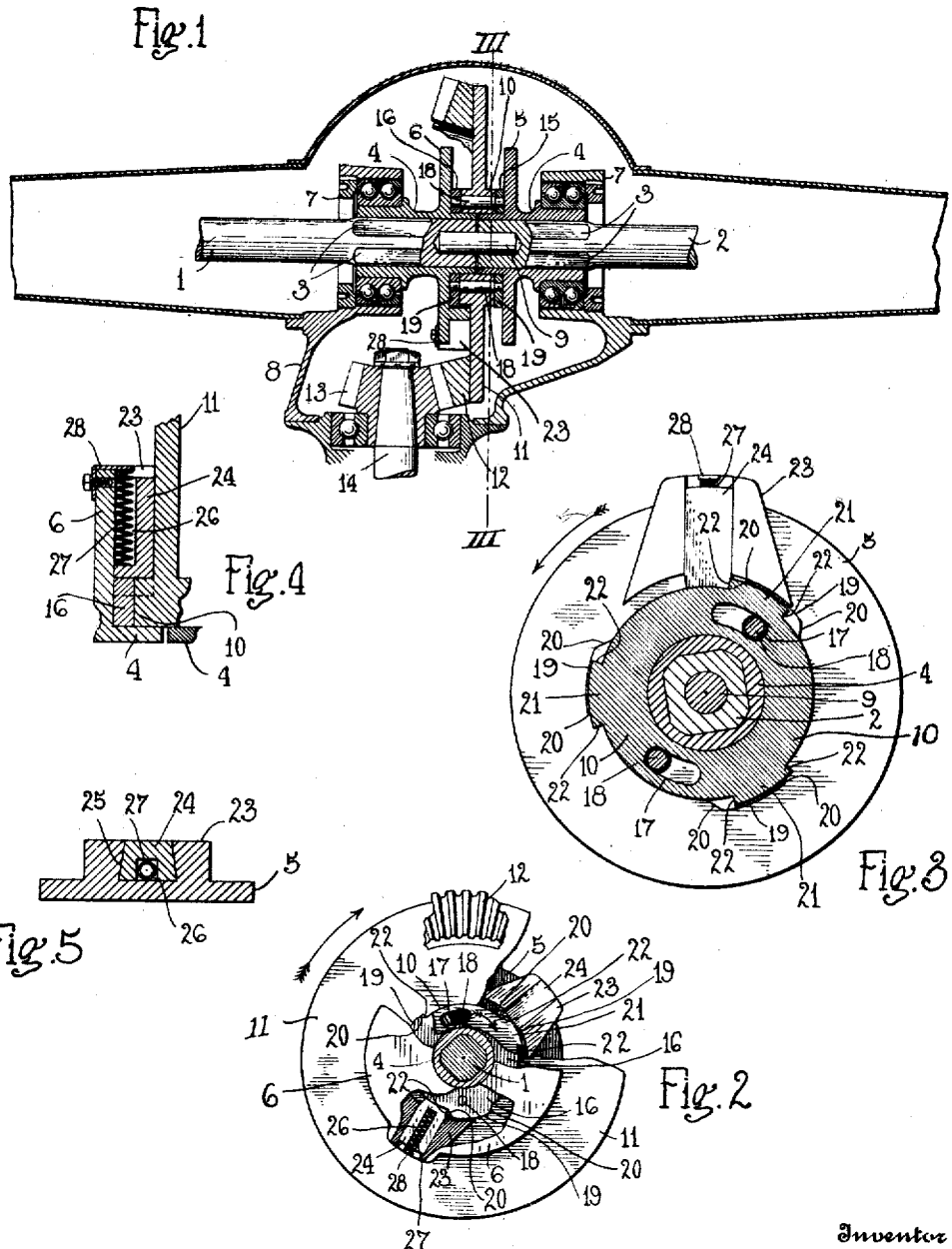
Witnesses
Anna M Dorr
Chas W Stauffer
Inventor
William Fleenor
By
Attorneys

UNITED STATES PATENT OFFICE.

WILLIAM FLEENOR, OF HIGHLAND PARK, MICHIGAN, ASSIGNOR OF ONE-HALF TO JOHN C. ALLEN, OF HIGHLAND PARK, MICHIGAN.

POWER-TRANSMITTING MECHANISM.

1,202,500.   Specification of Letters Patent.   Patented Oct. 24, 1916.

Application filed September 12, 1914. Serial No. 861,459.

*To all whom it may concern:*

Be it known that I, WILLIAM FLEENOR, a citizen of the United States of America, residing at Highland Park, in the county of Wayne and State of Michigan, have invented certain new and useful Improvements in Power-Transmitting Mechanisms, of which the following is a specification, reference being had therein to the accompanying drawings.

This invention relates to power transmitting mechanism in which driven members are positively rotated when turning at the same speed and are each free to turn independently of the other at a different speed, the invention relating more particularly to differential mechanism for the driving axles of motor vehicles and the like whereby one traction wheel is permitted to turn at a greater speed than the other when said wheel is traveling in a path having a greater radius than the path of the other wheel.

The object of the invention is to provide a simple construction for the purpose in which the driving member may be rotated in either direction to positively drive the driven members, and in which either driven member is free to rotate at a greater speed than its companion driven member in the direction of rotation of said member.

A further object of the invention is to provide a strong, compact, and durable construction which is cheap to manufacture and efficient in its operation.

With these and other ends in view the invention consists in the matters hereinafter set forth and more particularly pointed out in the appended claims, reference being had to the accompanying drawings in which—

Figure 1 is a longitudinal section through a device embodying the invention; Fig. 2 is an end elevation of the same with parts broken away and in section, illustrating the relative arrangement of the driving and driven elements; Fig. 3 is an enlarged section substantially upon the line 111—111 of Fig. 1; Fig. 4 is a sectional detail of a dog or detent forming part of the mechanism; and Fig. 5 is a transverse sectional view of the same.

In describing my invention by aid of the views above referred to, I desire to point out that the same are intended as merely illustrative of a construction whereby my invention may be applied in practice, and I do not confine my invention to the construction and arrangement of parts shown.

In the drawings, the reference numerals 1 and 2 denote the opposed end portions of a divided axle, said axle parts being formed rectangular in cross section at the adjacent ends or otherwise shaped to engage and turn with hubs 4 of driven elements or disks 5 and 6. The outer ends of the hubs 4 are journaled in anti-friction bearings 7 supported by an axle casing or housing 8. The anti-friction bearings 7 preserve the alinement of the confronting ends of the live axle parts 1 and 2 and in addition to said bearings there is a pin 9 loosely fitting within axial bores in the confronting ends of the parts, said pin aiding in maintaining the inner ends of the hubs 4 in proper alinement for the hub 10 of a driving member 11 which is sleeved thereon between the opposed faces of the disks 5 and 6. The driving member has beveled gear teeth formed thereon or upon a ring gear 12 secured thereto and in mesh with a bevel pinion 13 secured upon the end of a driving shaft 14, one end of which is revolubly supported by the axle casing or housing 8 in the usual manner.

The hub 10 of the driving member 11 is free to revolve upon the adjacent ends of the hubs 4 of the driven members 5 and 6, said hub being of a lesser length than the space between said driven disks or members in order to provide clearance for cam rings or members 15 and 16 loosely sleeved to turn upon the driven members against the ends of the hub of the driving member, said cam rings being connected to the driving member to turn therewith and having a limited turning movement relative thereto by providing segmental slots or openings 17 in the hub 10, as best shown in Fig. 3, through which slots loosely extend rollers 18 having reduced end portions journaled in the cam members 15 and 16. These cam members are of substantially the same diameter as the hub 19 of the driving member 11, as best shown in Fig. 1 and are connected by the rollers to turn in unison. Each member is formed with peripheral projections forming spaced cams 19 with beveled or inclined end faces, as at 20, and through the medium of the rollers 18 connecting the cam rings and the slots 17 in the hub 10, said cam projections are maintained in proximity to spaced segmental teeth or ribs 21 upon the periphery of the laterally projecting ends of the hub 10 at both sides of the driving member 11. These ribs 21 do not project as far as the cams 19 and said ribs are formed with abrupt shoulders 22 at each side thereof in contra-distinction to the beveled end faces 20 of the cams. The cams are of greater length than the ribs 21 so that one end thereof will always extend beyond or overlap the adjacent end of the ribs.

The inner face of each of the driven members 5 and 6 has a housing or guide 23 for a spring pressed dog or detent 24 and the inner end of each dog or detent is of a width in a direction longitudinally of the axle corresponding to the combined width of the rib 21 and adjacent cam 19 with which it contacts, whereby said dogs may each ride upon one of the cams or engage a shoulder 22 of the adjacent rib, said dogs being each formed to engage and slide in said housings 23 freely within dove tailed grooves 25 radially disposed relative to the axis of the driven members. Each dog has a recess 26 for a coiled compression spring 27 interposed between the bottom of the recess and a retaining member 28 on the outer end of each housing that protrudes over the open end of the groove 25 and retains the spring within its recess.

In order that the operation of the differential or power transmitting mechanism may be clearly understood, reference will be had to Fig. 3, and assuming that the driving element 11 is rotating counter-clockwise, as indicated by the arrow, with one or more of the shoulders 22 engaged with one or more of the dogs 24, the rear ends of the slots 17 will engage the rollers 18 and cause the cam rings 15 and 16 to revolve in a similar direction. The forward ends or shoulders of the ribs 21 of the driving member 11 are thus positioned in advance of the cams 19 of said members 15 and 16 with the rear ends of said projections to the rear of the rear shoulder, and consequently the forward shoulders engage the dogs or detents 24 and cause the driven elements 5 and 6 to revolve in unison with the driving element. Assuming that the driving member is revolving clockwise as indicated by the arrows in Fig. 2, one of the shoulders 22 engaged with one of the dogs to drive one of the driven members, the other driven member with its dog 24 may advance or turn at a higher rate of speed, its dog being free to leave the forward shoulder of the driving rib. When this dog, by reason of the greater speed of the driven member upon which it is carried, overtakes the next rib of the driving member, said dog is raised by engagement with the rear end of the adjacent cam and rides thereon over the rib without engaging the rear shoulder of said rib. Each driven member is therefore free at all times to rotate faster in the direction of rotation than the companion driven member and when rotating at the same speed, is positively driven by the engagement of one of the driving shoulders with its dog. While one driven member is turning faster than the other, its dog is reciprocated as it slides over the succeeding driving ribs upon the cam projections with which it is held in yielding contact by its spring 27. Upon reversal of rotation of the driving member, the cam rings shift or turn relatively thereto as they are driven solely by their rollers 18 extending through the slots 17 in the driving member and said rollers will therefore shift to the opposite ends of said slots upon reversal of rotation of the driving member. The slots limit the relative rotation of the driving and cam members so that when the direction of rotation of the driving member is changed, the cam rings will shift just sufficiently to clear the driving shoulders at the then advance side of the driving ribs and to project rearwardly beyond the ribs in a position to be engaged by the dog of a driven member should one of said members be turned by an exterior force faster than the speed at which the other is driven. In motor vehicle construction, this exterior force would be the outer traction wheel traveling in a greater radius in contact with the ground than the inner wheel which would turn the slower of the two and would thus be positively driven by the motor. In turning a corner, the inner wheel is therefore the driving wheel and the vehicle is less liable to skid or slide laterally. In this arrangement the power is always applied to the wheel which offers the greater resistance to turning and the maximum traction is thus secured.

I claim—

1. In a power transmitting mechanism, rotary driven and rotary driving member radially movable, dogs carried by certain of said members and shoulders on certain other of said members to be engaged by the dogs when the members are turned in either direction, and cam members having a limited movement relative to said members so as to direct the respective dogs away from the shoulders when the driven members revolve faster than the driving member.

2. In a power transmitting mechanism, rotary driven members, a rotary driving member therebetween having a hub portion at each side thereof provided with projecting shoulders, dogs bodily movable in a radial direction carried by the driven members to engage the shoulders when the driving member is turned in either direction, and cam rings disposed between the ends of the hub of the driving member and driven members in frictional engagement with said members and having a limited rotation relative to the driving member to engage and lift the respective dogs from the path of the shoulders when the driven members revolve faster than the driving member.

3. In a power transmitting mechanism, rotary driven members, a rotary driving member therebetween, radially disposed dogs carried by the driven members, the driving member having shoulders to be engaged by the dogs when turned in either direction, cam members frictionally engaging the driven members and provided with peripheral cams, and means connecting the cam members and working through slots in the driving member to permit of a relative limited turning movement between the cam members and driving member, so that the cams will engage and lift the respective dogs away from the shoulders when the driven members revolve faster than the driving member.

4. A power transmitting mechanism, rotary driven members, a rotary driving member therebetween and having a hub portion at each side provided with shoulders, dogs carried by the driven members and bodily movable radially thereof to engage the shoulders when the driving member is rotated in either direction, members having peripheral cam portions adjacent to said shoulders and adapted to engage beneath said dogs to raise the same radially out of the path of said shoulders, means connecting the driving member with said members having the cam portions to turn therewith and permitting a limited relative turning movement of said driving and cam members.

5. In a power transmitting mechanism, rotary driven members, a rotary driving member therebetween, radially movable dogs on the driven members, the driving member having shoulders to be engaged by said dogs when turned in either direction, and cams adjacent to said shoulders having a limited movement relative to the driving member so as to bring said cams into the path of said dogs and move the same away from the shoulders when either of the driven members revolve faster than the driving member.

6. In a power transmitting mechanism, a two-part shaft, rotary driven members on the abutting ends of said shaft, a driving member rotatable on the shaft between said members, radially movable dogs, said driven members being provided with radial guides for said dogs and the driving member having concentric enlargements on its sides formed with shoulders to engage the dogs when the driving element is rotated in either direction, and cam members disposed between the driving and driven members and having limited rotation relative to the driving member and provided with cam projections opposite said enlargements to engage and raise said dogs out of the path of said shoulders when the driven members revolve faster than the driving member.

7. In a power transmitting mechanism, rotary driven members, a rotary driving member therebetween, radially movable spring actuated dogs on the driven members, the driving member having shoulders to be engaged by said dogs when turned in either direction, and cam members rotatively mounted to turn with and relatively to the driving member, said cam members being provided with cam projections adjacent to said shoulders and adapted to be engaged by said dogs when said driven members are turned faster than said driving member.

8. In a power transmitting mechanism, rotary driven members, a rotary driving member therebetween and having concentric shoulders, yieldable dogs on the driven members to engage the shoulders when the driving member is revolved in either direction, and cam members frictionally engaging the driven members and connected to the driving member to turn therewith and having a rotatable movement relative thereto to engage beneath the dogs and lift the same out of the path of the shoulders.

9. In a power transmitting mechanism, rotary driven members, a rotary driving member therebetween and having projecting portions formed with shoulders at its ends, dogs carried by the driven members to engage the respective ends of the projections when the driving member is rotated in either direction, cam members disposed between the driving and driven members, each cam member having a plurality of cams to engage the dogs and move the dogs out of engagement with the shoulders, and means connecting the cam members and operating to cause the said cam members to rotate with the driving member and adapted to permit the same to have a movement relative thereto.

10. In a power transmitting mechanism, a two-part shaft, rotary driven members secured to adjacent ends of the shaft parts, a rotary driving member between the driven members free to turn upon the shaft and having a concentric slot and a plurality of radial projections, dogs on the driven members to engage the respective ends of the projections when the driving member is turned in either direction, cam members disposed between the driving and driven members, each cam member having a plurality of peripheral cams adjacent the respective projections to engage beneath the dogs, and pins connecting the cam members and working through the slots in the driving member.

11. In a power transmitting mechanism, a rotary driving member, a rotary driven member, a dog carried by one of said members, the other member having projections forming shoulders to be engaged by said dog when the driving member is rotated in either direction, and a member having limited movements relative to the member having the shoulders and provided with cam projections adjacent the shoulders and of greater length than the length of said projections forming the shoulders, to engage the dog and lift the same out of engagement with the shoulders when the driven member rotates faster than the driving member.

12. In a power transmitting mechanism, a rotary driving member, a rotary driven member, a radially movable dog on one of the said members, the other member having shoulders facing in opposite directions to be engaged by the dog when the driving member is rotated in either direction, and a cam member frictionally engaging that member having the dog, and having limited movements relative to that member having the shoulders, the cam member having cams coöperating with the respective shoulders, for the purpose set forth.

In testimony whereof I affix my signature in presence of two witnesses.

WILLIAM FLEENOR.

Witnesses:
H. J. DANLER,
HARRY OPIE, Jr.

Copies of this patent may be obtained for five cents each, by addressing the "Commissioner of Patents, Washington, D. C."